(12) United States Patent
Scozzaro et al.

(10) Patent No.: US 10,341,382 B2
(45) Date of Patent: Jul. 2, 2019

(54) SYSTEM AND METHOD FOR FILTERING ELECTRONIC MESSAGES

(71) Applicant: SISVEL TECHNOLOGY S.R.L., None (IT)

(72) Inventors: Andrea Scozzaro, Turin (IT); Gianluca Previti, None (IT)

(73) Assignee: SISVEL TECHNOLOGY S.R.L., None (IT)

( * ) Notice: Subject to any disclaimer, the term of this patent is extended or adjusted under 35 U.S.C. 154(b) by 85 days.

(21) Appl. No.: 14/894,844

(22) PCT Filed: Jun. 17, 2014

(86) PCT No.: PCT/IB2014/062286
§ 371 (c)(1),
(2) Date: Nov. 30, 2015

(87) PCT Pub. No.: WO2014/203157
PCT Pub. Date: Dec. 24, 2014

(65) Prior Publication Data
US 2016/0119376 A1   Apr. 28, 2016

(30) Foreign Application Priority Data

Jun. 21, 2013 (IT) .............................. TO2013A0513

(51) Int. Cl.
*H04L 9/00* (2006.01)
*H04L 29/06* (2006.01)
(Continued)

(52) U.S. Cl.
CPC ........ *H04L 63/1483* (2013.01); *H04L 9/3247* (2013.01); *H04L 51/12* (2013.01);
(Continued)

(58) Field of Classification Search
CPC .................................................. H04L 63/1483
(Continued)

(56) References Cited

U.S. PATENT DOCUMENTS 7,461,339 B2 * 12/2008 Liao .................... G06F 17/2264
715/234
7,496,634 B1 * 2/2009 Cooley ................ G06Q 10/107
709/205
(Continued)

FOREIGN PATENT DOCUMENTS

WO       2003/044617 A2    5/2003

OTHER PUBLICATIONS

International Search Report and Written Opinion dated Aug. 13, 2014, issued in PCT Application PCT/IB2014/062286, filed Jun. 17, 2014.

*Primary Examiner* — Christopher J Brown
(74) *Attorney, Agent, or Firm* — Workman Nydegger

(57) ABSTRACT

A system for filtering electronic messages includes a client machine that includes a security module, wherein the security module has access to at least one message sent by a sender identified in the message through respective identification data and received by the client machine, wherein the security module is configured for reading the sender's identification data from the header of the message, finding and storing any potentially harmful contents of the body of the message, verifying if said potentially harmful contents satisfy validation conditions which are specific for the sender having the identification data specified in the header of the message, allowing or denying access to at least part of the body of the message, in which the potentially harmful contents are present, based on the result of the verification.

19 Claims, 7 Drawing Sheets

(51) Int. Cl.
*H04L 12/58* (2006.01)
*H04L 9/32* (2006.01)

(52) U.S. Cl.
CPC ...... *H04L 63/0227* (2013.01); *H04L 63/1441* (2013.01); *H04L 63/168* (2013.01)

(58) Field of Classification Search
USPC .......................................................... 726/7
See application file for complete search history.

(56) References Cited

U.S. PATENT DOCUMENTS

| | | | | |
|---|---|---|---|---|
| 7,665,131 | B2 * | 2/2010 | Goodman | G06Q 10/107 |
| | | | | 726/13 |
| 7,751,620 | B1 * | 7/2010 | Cosoi | G06K 9/4652 |
| | | | | 382/168 |
| 8,079,087 | B1 * | 12/2011 | Spies | G06F 17/30873 |
| | | | | 709/205 |
| 2006/0200523 | A1 | 9/2006 | Tokuda et al. | |
| 2007/0282953 | A1 * | 12/2007 | Jain | G06Q 10/107 |
| | | | | 709/206 |
| 2008/0104180 | A1 | 5/2008 | Gabe | |
| 2013/0185802 | A1 * | 7/2013 | Tibeica | H04L 63/1483 |
| | | | | 726/26 |
| 2013/0275384 | A1 * | 10/2013 | Sivasubramanian | |
| | | | | G06Q 10/107 |
| | | | | 707/664 |

\* cited by examiner

SYSTEM AND METHOD FOR FILTERING ELECTRONIC MESSAGES

BACKGROUND OF THE INVENTION

1. Field of the Invention

The present invention relates to a system and a method for filtering electronic messages. It is known, in fact, that most cyber attacks to single users occur through messaging services such as electronic mail, instant messaging or the like.

2. Present State of the Art

Within the frame of electronic messaging services, a technique which is commonly used for swindling users is known as "phishing". Phishing is a kind of cyber attack in which the user (victim) is invited to provide sensible data (e.g., bank account numbers, credit card numbers, confidential personal data, passwords, etc.), and then such data are collected by means of a server configured for deceiving the user, preferably through a graphic layout that is very similar or identical to that of a server on which the user usually carries out transactions requiring him/her to enter said sensible data.

More in detail, an ill-intentioned person (phisher) sends to the user, e.g., via electronic mail (email) and/or an instant messaging service, a message that simulates, in its graphic layout and/or formatting and/or contents, a message of an institution known to the addressee, e.g., a bank where the user has a bank account, a web service provider, an online auction site where the user has registered an account, or the like.

This message usually contains a warning about particular situations or problems requiring a quick response by the user, such as a large debit transaction on the user's bank account, the expiry of the account through which the user can make financial transactions, winning a large sum of money, or the like. Typically the message recommends to quickly find a solution to that situation or problem through one or more hyperlinks directing the user to one or more web pages residing on the server, which, being controlled by the ill-intentioned person, can fraudulently gather sensible data. In fact, these web pages are so constructed as to have the user believe that his/her data are being given to a trusted institution (e.g., a bank, a shipping company, or the like), while such data are, on the contrary, being collected for use by the ill-intentioned person.

Such sensible data are then used by the ill-intentioned person to commit criminal actions, e.g., transferring sums of money from the deceived user's bank account to another account, or selling the data to organizations that will use them for commercial purposes and/or for creating false identities useful for masking illicit activities.

Different approaches are currently available for facing the phishing problem. Many of these methods for filtering messages are based on the use of software programs on electronic computers, which implement techniques for recognizing and cataloguing the text of messages (e.g., through the use of suitably trained neural networks or the like). Unfortunately, these techniques always give a certain number of false positives/negatives, i.e., some "normal" (non-fraudulent) messages are catalogued as fraudulent messages, whereas a certain number of fraudulent messages are catalogued as non-fraudulent messages, thus not ensuring an adequate level of security for the user's sensible data.

In addition, fraudulent messages often contain images representing text that, since it cannot be immediately deciphered by a computer, requires an optical recognition process (OCR). The latter process increases the computer's computational load, thus reducing the number of messages that can be processed per time unit.

A further method for filtering messages is based on the use of a digital signature, which, although it ensures a high protection level, compels the sender to sign every message with his/her private key prior to sending it, thus increasing the number of steps that must be carried out by the user, who may not be able to obtain one or may not know about this possibility. Moreover, digital signatures are not always available, as is the case, for example, when sending an email message through a web browser, i.e., in the so-called webmail mode. This problem becomes even more apparent when strings of hyperlinks contained in the messages include specific parameters (e.g., the user's univocal identifier), in that each message will have different contents (and hence a different hash) from any other message being sent.

It should also be pointed out that most messages that are sent to the user, even from actual organizations warning about a particular situation (e.g., expiry of a password or the like) are usually transmitted in clear, so that this approach is hardly compatible with the current use of messaging services, particularly electronic mail, and with the applications that manage that aspect.

In addition, victims generally do not have the capability of accurately checking if an incoming message contains a digital signature; therefore, a message sent by an ill-intentioned person, even without a digital signature, might be considered to be authentic.

Anti-phishing prevention systems are known which deny access to hyperlinks contained in electronic messages based on whether the sender belongs or not to a certain sender category, e.g., senders reported as unwelcome and/or unreliable, or because, based on the analysis of the message content, the message is not considered to be safe when it comes from an unknown sender. These systems are not always effective, since sometimes said analysis provides wrong results. Moreover, they do not take into account the fact that some hyperlinks may be reliable if they are included in messages from a certain sender, but they may not if they are included in messages from another sender.

It is also possible that access to a trusted user's electronic mail or instant messaging account is gained by ill-intentioned people, who can then use it to send messages containing fraudulent hyperlinks. The known anti-phishing systems may not be able to intercept these counterfeit messages, since they come from senders considered to be reliable, while they are not.

In addition, ill-intentioned persons might send email messages from uncertified and publicly accessible servers, by perfectly simulating transmissions from known senders held as reliable by other email users. In this case as well, any dangerous links may not be blocked by the anti-phishing systems known in the art, so that the victim user may incur substantial risks for his/her property and privacy.

In U.S. patent application US 2008/104180 A1 to Christopher John GABE, it is described an anti-spam (not anti-phishing) system based only on the verification of the message sender's identifier. In order to do that, the identifier is sent to a server that verifies if said identifier is present in a database of identifiers, so as to estimate, through a suitable function, the probability that a message coming from a certain sender is undesired. This system, however, has the limitation that the estimate of the probability is carried out only on the basis of the message sender's identifier and not also on the basis of parts of the body of said message, thereby exposing the system to the risk of making mistakes especially in case where a trusted e-mail account is violated and used to send messages having fraudulent content.

The International patent application WO 03/044617 A2 to Reginald ADKINS describes an anti-spam system configured to operate in the following way: each time an email is received, it is checked whether the address of the sender of the received email belongs to the authorized address book (inclusive address book) or to the rejected address book (exclusive address book) or to the temporarily authorized address book (temporary address book); in the case where the address of the sender is not part of any of the categories, a truncated version of the message body is examined by means of the filters to search for contents such as offensive language, web links, contact information, e-mail attachments; after that the message is ranked on the basis of the search result. This approach has the limitation that the filters employed are of generic type, i.e., suitable for any type of message, by exposing the system to the risk of making classification errors.

In U.S. patent application U.S. 2006/200523 A1 to TOKUDA et al., it is described an anti-phishing system in which the message sender is validated on the basis of an anti-fraud policy which can verify if a certain e-mail message was actually sent by the sender specified in the header of the message. This anti-fraud policy is applied equally to all the messages, and to those considered authentic is added a header which attests the authenticity. In this way, it is possible to distinguish between authentic messages and fraudulent ones, similarly to that carried out by the two systems described in the cited documents. This system has the limitation that the messages are authenticated without examining the contents of the message body, but only using methods based on encrypted stamps (e.g., Truemark®) that make the use of this system unsuitable and burdensome from the computational point of view. In fact, for implementing this system, it is necessary to use cryptographic keys by creating considerable problems from the point of view of compatibility for the email clients that do not support these authentication systems.

Moreover, all the systems according to the above-described prior art perform a limited number of actions: once identified an unwanted message or a not authentic one, said systems classify said message as such, but do not block the user access to the body of said message and, therefore, also to potentially dangerous content.

SUMMARY OF THE INVENTION

The present invention aims at solving these and other problems by providing a method and a system for filtering electronic messages.

The basic idea of the present invention is to verify if at least a part of the body of the received message has characteristics, e.g., hyperlinks and/or special message formatting, which have been specified by the message sender.

This idea allows filtering messages in a quick and effective manner, considerably reducing the presence of false positives/negatives and avoiding the use of asymmetric cryptography. Furthermore, the message can be checked without opening any hyperlinks included therein.

Further advantageous features of the present invention will be set out in the appended claims.

BRIEF DESCRIPTION OF THE DRAWINGS

These features as well as further advantages of the present invention will become more apparent from the following description of an embodiment thereof as shown in the annexed drawings, which are supplied by way of non-limiting example, wherein.

DETAILED DESCRIPTION OF THE PREFERRED EMBODIMENTS

Figure 1:
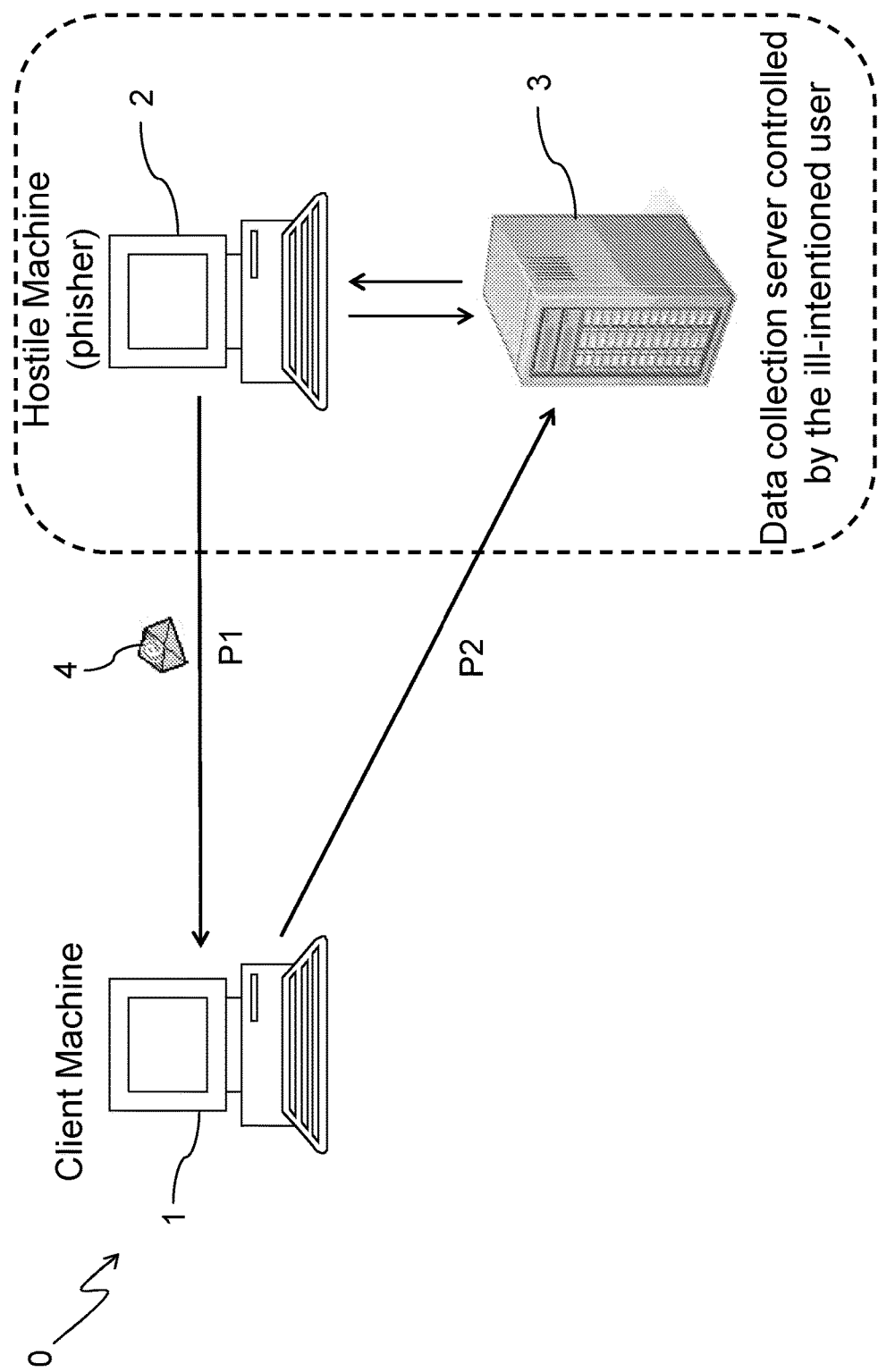
FIG. 1 shows a typical scenario in which a victim user is swindled.

With reference to FIG. 1, a scenario 0 in which a potential victim can be swindled comprises a client machine 1, a hostile machine 2 controlled by an ill-intentioned person (also called phisher), and a hostile data collection server 3, in turn controlled by the hostile machine 2.

In the scenario 0, the fraud begins with a message sending step P1, wherein a message 4 is sent to the addressee 1 from the hostile machine 2. This message 4 comprises a body which can contain one or more potentially dangerous content, and a header which includes identification information identifying the sender of that message 4.

An example of potentially dangerous content are at least one hyperlink or URL (Uniform Resource Locator), which allow the malicious person to start a data collection step P2, e.g., by opening a communication session with a web server residing in the hostile data collection server 3, which simulates the presence of an authentic Internet site known to the user.

Figure 2:
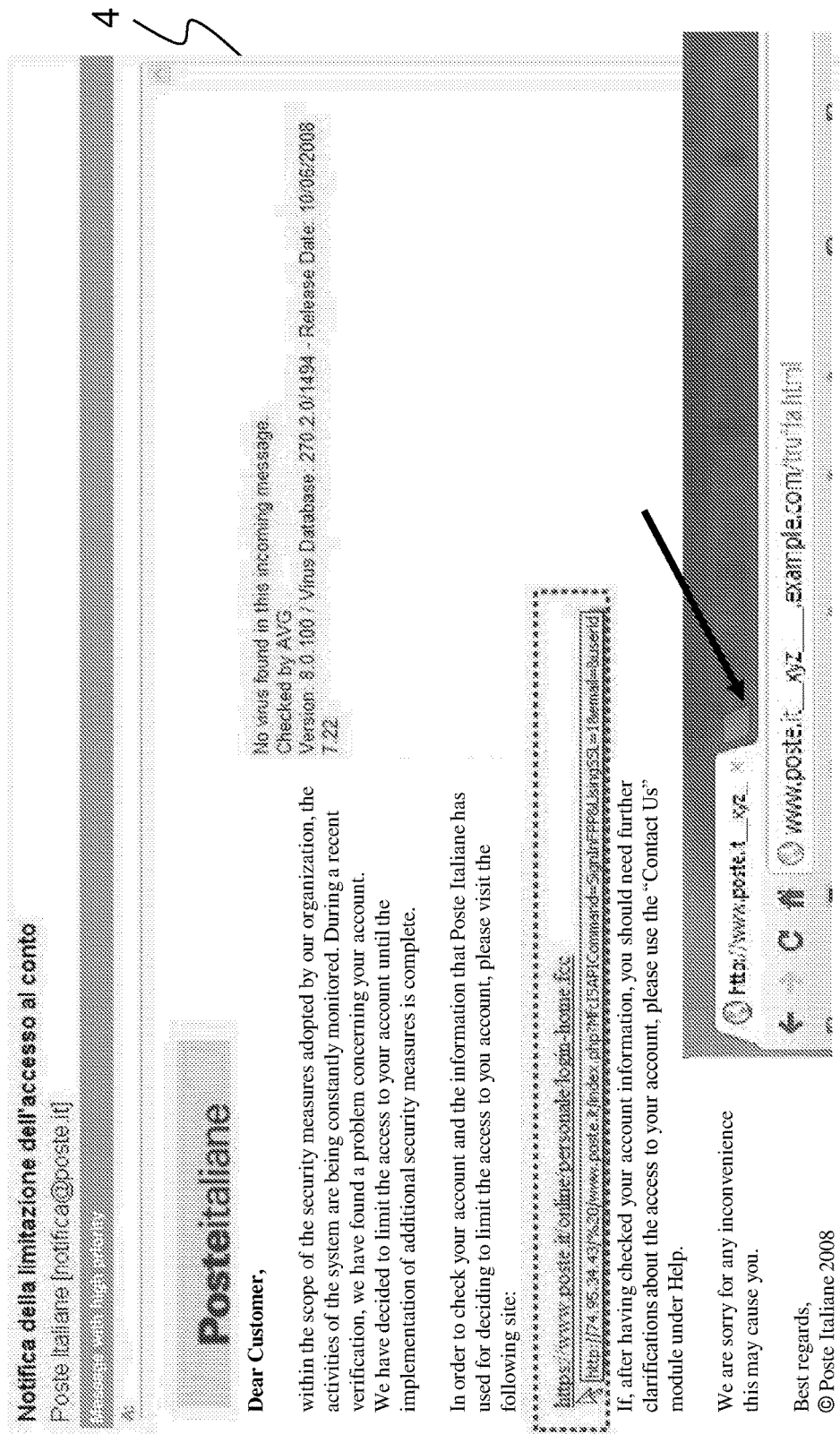
FIG. 2 shows a typical example of a fraudulent message sent to the potential victim.

Also with reference to FIG. 2, a typical example of a fraudulent message 4 simulates Poste Italiane as a sender. This message 4 is so constructed as to show "Poste Italiane" as a sender name and "notifica@poste.it" as the email address of origin, wherein the domain poste.it is authentic (see reference 20). The message text contains a hyperlink 25, the clear address of which appears to be authentic: "https://www.poste.it/online/personale/login-home.fcc". In fact, it apparently belongs to the domain assigned to Poste Italiane (poste.it) and, in addition, it appears to use HTTPS (Hyper-Text Transfer Protocol over Secure Socket Layer) as an encrypted communication protocol, which is normally used on the Internet for collecting sensible data that need to be protected against malicious attacks. Actually, the message is so devised as to cause the URL of a page of the Poste site to be displayed, while the URL actually present (http://74.95.34.43/%20/www.poste.it/index.php?MfcISAPICommand=SignInFPP&UsingSSL=1&email=&userid) activates a communication session with a hostile server 3 controlled by the phisher, which hosts a fake Internet site that simulates the authentic Poste site. When the user clicks on the camouflaged hyperlink 25, this will open an Internet navigation window 28 simulating, even in the header, the Poste site where the user has an on-line account.

Of course, the present invention acts upon actual hyperlinks, not on apparent ones, which in counterfeit messages differ from the actual ones and simulate a reference to secure and authentic sites. For example, in a message formatted in the HTML (Hyper Text Markup Language) formatting language, the present invention will (also) examine the field "HREF" of the label "<A>", containing the web address to which the user would be directed should he/she click on the malicious link.

During the data collection step P2, the victim user enters data (e.g., sensible data such as access credentials in the form of username and password, account number or the like) into the hostile data collection server 3, which will then store them locally and/or send them to the hostile machine 2 at the end of step P2. In this manner, the hostile machine 2 can take possession of the victim user's sensible data, thus allowing the ill-intentioned user with access to the hostile machine 2 to use said data for fraudulent purposes.

It will be apparent to those skilled in the art that the hostile machine 2 and the hostile data collection server 3 may be a single machine, without necessarily having to be two distinct machines. Moreover, the URL may, without distinction, direct to a page of a site, to a document, or to an electronic file of any kind (executable file, compressed file, image, video, etc.), or in general to any on-line reachable resource made available by the ill-intentioned person for fraudulent purposes.

Figure 3:
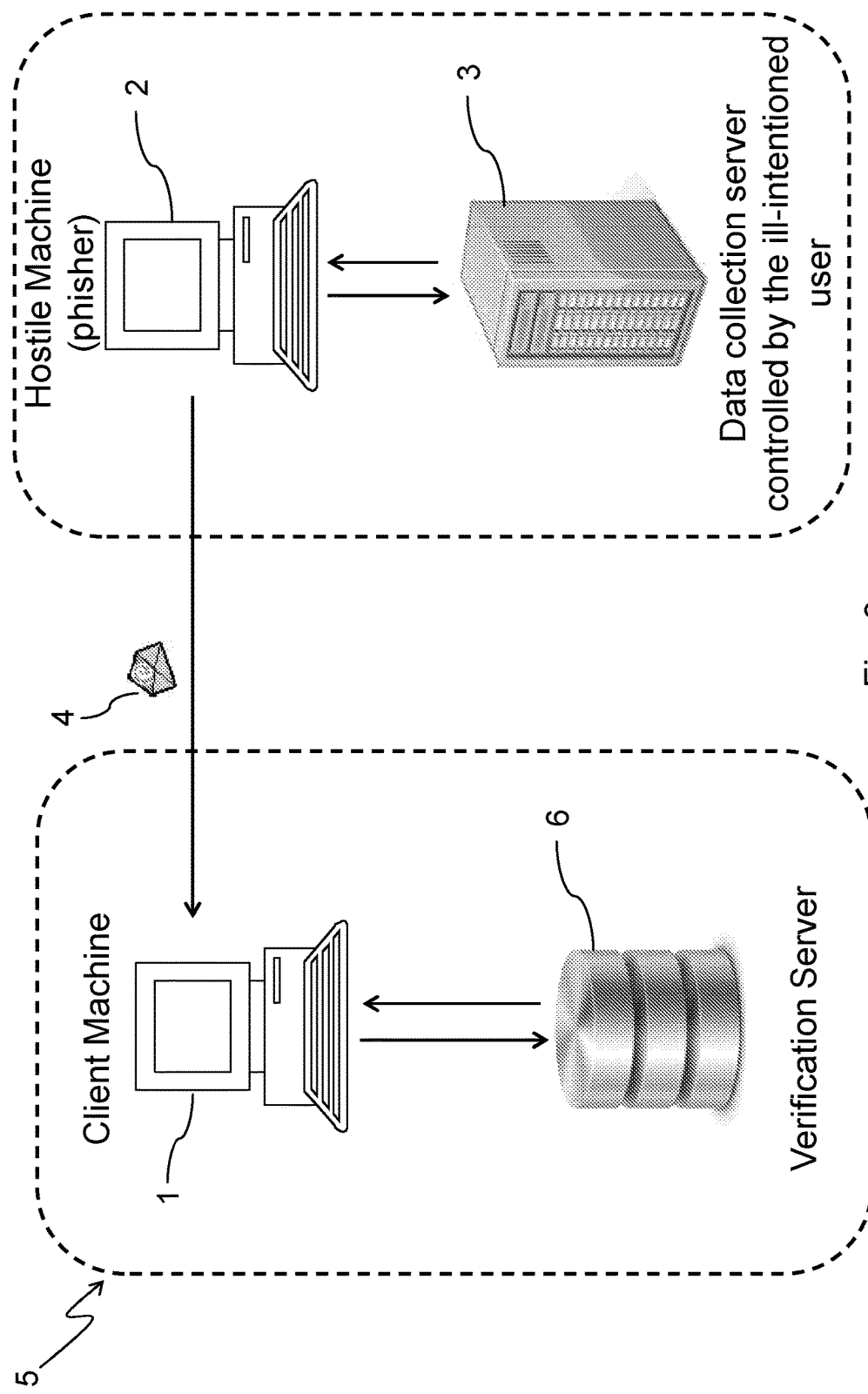
FIG. 3 shows how the system according to the present invention is applied to the scenario of FIG. 1.

Also with reference to FIG. 3, a system for filtering electronic messages 5 comprises at least one security module; said security module is preferably a computer program or a software component, preferably an additional software component (plug-in), that can interact with messaging and/or web navigation software (e.g., Outlook, Thunderbird, Skype, Internet Explorer, Chrome, Safari or the like) comprised in the client machine 1, so that said module can gain access to at least a part of each received message, in particular to the content and to the sender's address and/or name of each message.

The content is typically a string of characters, but may also consist of images, sounds or the like, whereas the sender's address is a string of characters that univocally identifies a certain person who is sending the message. For electronic mail, the sender's address is formatted in accordance with the Internet RFC 5321, RFC 5322 and RFC 6531 standards, whereas for instant messaging applications, such as Skype, it is a simple string of characters. The sender's name is generally a name associated with the sender's address, and is composed of a string of characters (alphabetic letters, numbers, special characters like "@", "_", "-" etc.), which is usually chosen by the user on the basis of predefined rules set by third parties.

Once the content of at least one of the messages received by the user is accessible to the security module, said module is configured for executing the following steps:
  a. reading the address and/or name of the sender of the message, preferably contained in the header of the message;
  b. selecting one or more sensible parts of the message (also known as potentially dangerous content), preferably hyperlinks which are present in the body of the message;
  c. verifying that the sensible parts of the message selected during step b. satisfy validation information specified by and/or specific for a sender whose address is the one specified in the header of the message, and is read at step a.;
  d. communicating to the user the result of the verification carried out at step c., preferably by enabling or disabling access to at least part of the message body, in which sensitive parts (potentially dangerous content) are present, based on the outcome of the verification carried out at the step c.

The sensible parts of a generic email message may comprise hyperlinks included therein; however, as an alternative or in combination, they may also include message parts which cannot be directly seen by the user of the client machine 1, such as, for example, Internet addresses, invisible characters (e.g., character 255 of the ASCII code), formatting, or the like. In this manner, the invention not only allows to protect the user against computer attacks made by using the "phishing" technique, but also to verify if a received message is properly formatted, so as to advantageously further reduce the risk that a malicious user can make an attack by altering the content of a message.

One typical example of message alteration is called "email spoofing", i.e., parts of the electronic mail message are altered in order to make the user believe that the message sender is a third party. By using the invention described herein, in addition to preventing the ill-intentioned user from entering hyperlinks directing to a hostile data collection server 3 under his control, it is also possible to verify that the message has certain characteristics (e.g., invisible characters in a given position), so as to advantageously reduce the probability that the ill-intentioned person will be able to carry out actions to the detriment of the user of the client machine 1.

The selection of at least one sensible part of the received message is preferably made by using a syntactic analysis algorithm (parser), which, by using the message, preferably the text thereof, as input, will output the sensible part(s) of the message.

As is known to those skilled in the art, this syntactic analysis algorithm is preferably built/generated by starting from a grammar that comprises a set of regular expressions and, if necessary, also a number of production rules.

The execution of step c. by the security module requires the use of the sender's address and/or name for retrieving and selecting validation information specified by the sender.

This validation information preferably comprises a list of strings identifying Internet domains that normally host contents to which reference is made, through hyperlinks, in the text of the messages received by the user of the client machine 1.

However, in combination with or as an alternative to the list of Internet domains, this validation information may also comprise other objects, e.g. images, sounds, formatting data, algorithms, grammars, or the like.

Once the validation information has been retrieved and selected, the sensible part(s) of the received message is(are) verified by using said validation information.

In the preferred embodiment, step c. consists of verifying if each one of the hyperlinks included in the message, preferably an email message, refers to a content which is present in at least one of the Internet domains included in a list of domains selected on the basis of the sender's address; the verification is successful if all hyperlinks meet such criterion, otherwise the verification is unsuccessful.

The result of the verification carried out at step c. is communicated to the user during step d., preferably by means of a visual and/or audible signal, e.g., by highlighting with a red icon those messages for which the verification has been unsuccessful, and with a green icon those messages for which the verification has been successful. If the verification is unsuccessful, then the hyperlinks will be preferably disabled without requiring the user's intervention, so that said user will not fall prey to the ill-intentioned person.

A man skilled in the art may have the security module communicate with the user of the client machine 1 differently than described above, without however departing from the teachings of the present invention.

In the preferred embodiment, the system for filtering electronic messages 5 comprises a verification server 6. This verification server 6 comprises means for storing data useful to ensure the proper operation of the system 5, i.e., to prevent the user of the client machine 1 from being exposed to the risk of fraud; such data residing in the verification server 6 preferably comprise also the validation information.

Furthermore, said verification server 6 can be contacted by the security module during the execution of the above-described step c. by means of a network connection (e.g., an Internet/Intranet connection or the like).

Figure 7A:
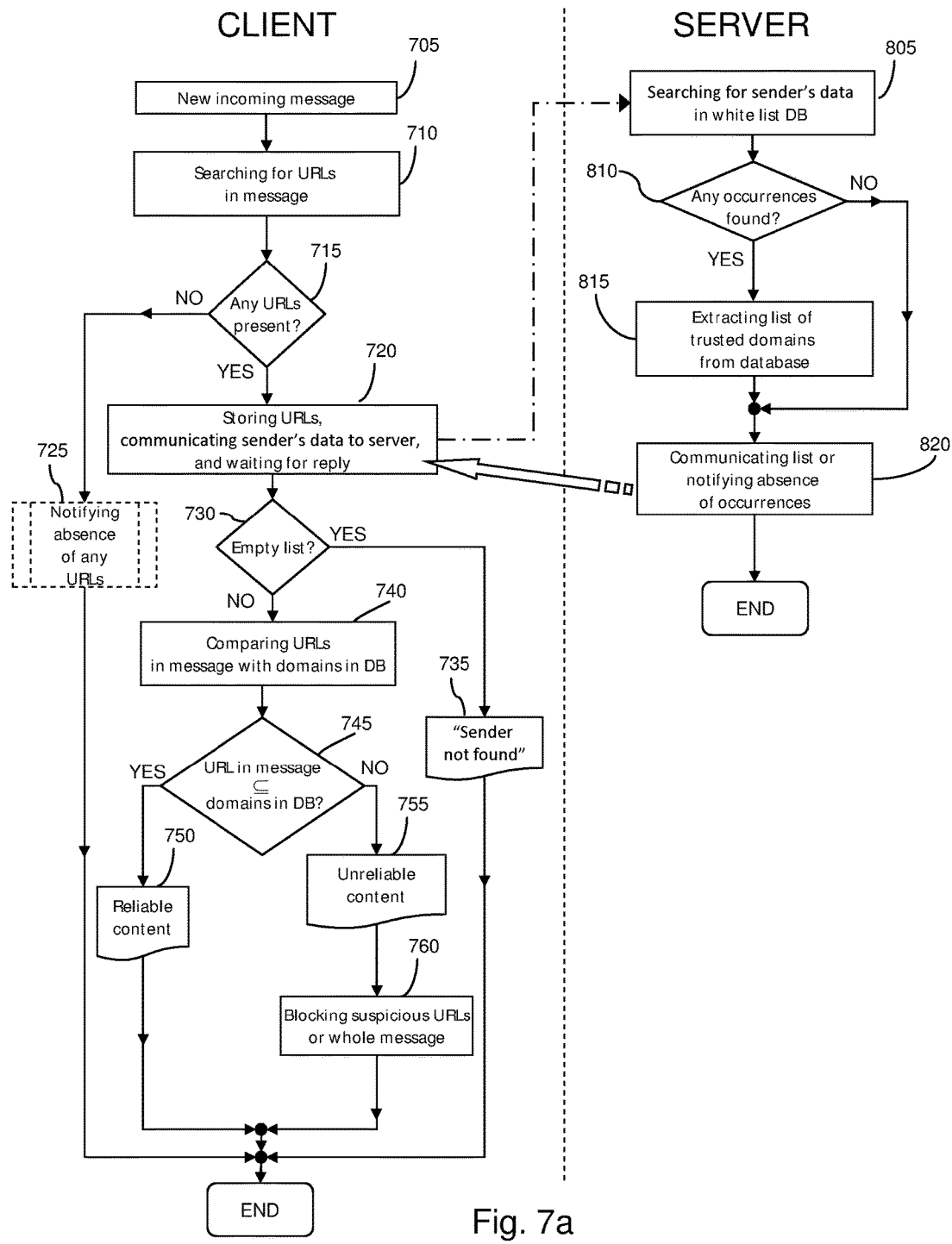
FIG. 7 shows one embodiment of the invention according to the client-server model.
Figure 7B:
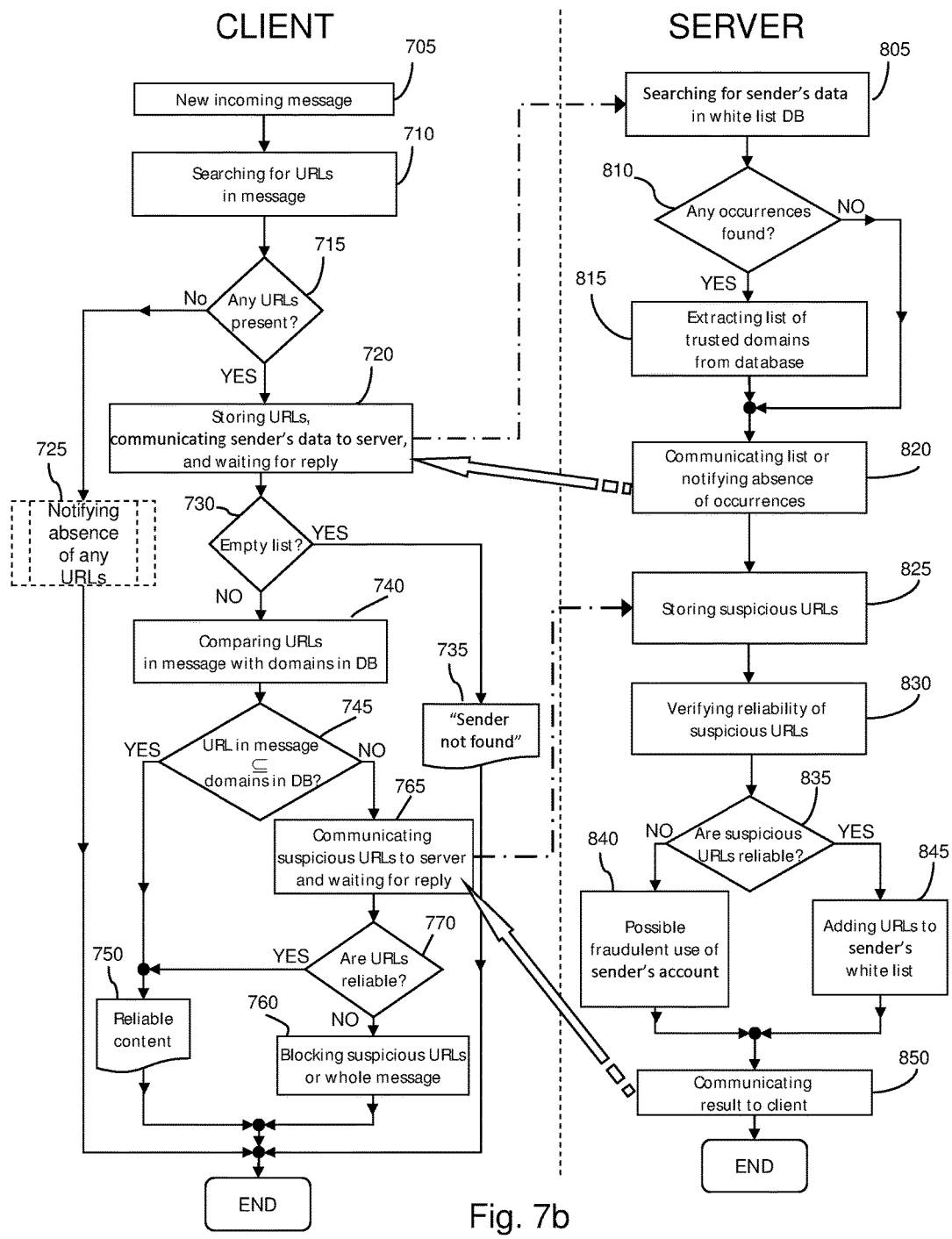

FIG. 7 shows one embodiment of the invention that uses the client-server implementation model. In particular, FIG. 7a shows a simpler embodiment, whereas FIG. 7b shows a more sophisticated one. In both cases, the process begins at the arrival of a new electronic mail or instant message 705 on the client side. The message is first analyzed by the parser (step 710) in order to verify the presence in the message 4 of any potentially harmful contents, such as URLs (verification step 715). If the result is negative (absence of any URLs), said absence will be optionally notified to the user (step 725), the message will be considered to be safe, and the process will end. If the result is positive (presence of at least one URL in the message), then the hyperlinks will be stored and communicated, together with the identification data of the sender of the message under examination, to the server side at step 720. At this point, the client enters a standby state, waiting for a reply from the server.

The latter searches a database DB for the list of allowable URLs (the so-called white list) for the sender identified in the communication received from the client (step 805). Then, at step 810, it is verified if there are any occurrences for the sender of the message 4; if there are, at step 820 the list of allowable Internet domains will be extracted from the database DB and communicated to the client; otherwise, the absence of any occurrences or an empty list will be communicated to the client. In a simplified embodiment of the invention, the server at this point ends all operations, which will then continue on the client side, where the client is at step 720, waiting for a reply.

At step 730, the communication received from the server is verified: if the list is empty, i.e., the DB contains no data relating to the sender of the message 4, at step 735 the user will be notified that the sender is unknown to the anti-phishing system, and the process will end. If the list is not empty, at step 740 it will be verified if the URLs contained in the message and previously stored satisfy the predefined security requirements. In general, it is required that the URLs belong to Internet domains or Internet addresses extracted from the database. In a more sophisticated embodiment of the invention, it may be required that, in order to be accepted, the URLs included in the message must also, in addition to belonging to domains specified in the DB for that sender (white list), utilize access protocols defined as admissible (e.g., one or more of the http, https, ftp, smtp, etc. protocols).

In another embodiment of the invention, the list received at step 720 may contain Internet domains associated with a sender that is only similar to the searched one, but not exactly equal. For example, the (fake) sender "Posta Italiana" may produce the same results as the (real and counterfeit) sender "Poste Italiane".

At the verification check step 745, there are two possibilities: the security criteria established for URLs are complied with, and therefore the message will be considered to be reliable, or not.

If the message 4 is considered to be reliable, at step 750 the hyperlinks will be activated or left active, access to the message 4 and the contents thereof will be allowed, and the process will end.

If the content of the message 4 is not considered to be reliable, the invention can be implemented in two ways: the first option is exemplified in FIG. 7a, the second one in FIG. 7b. Referring now to the first option (FIG. 7a), the message is considered to be unreliable (step 755), and at the next step 760 either the links that are not present in the DB will be blocked or access to the whole message will be denied, depending on the active security settings, wherein said security settings may be more or less stringent.

In the event that the searched sender is not exactly equal, but only similar, to the sender found in the DB, a further warning will be sent to the user in order to indicate such difference and require the user to make further verifications. Afterwards, the procedure will end on the client side as well.

In this embodiment of the invention, the client cannot by any means influence the information present in the DB of the server. Its white lists are under exclusive control of the server and its administrator, who can decide about the record creation and update policies (additions, deletions and modifications).

In the second embodiment of the invention, shown in FIG. 7b, at step 765 the client communicates to the server the suspicious URLs, i.e., those that did not pass the verification at step 745, and will then enter a standby state, waiting for a reply from the server side concerning their trustworthiness. The server receives said list and stores it (step 825), and then it verifies their trustworthiness at step 830. This verification can be carried out in many ways known to the man skilled in the art. For example, it is possible to consult data banks containing the list of domains and/or URLs that have been reported as unreliable or dangerous (black list), or other data banks indicating the list of domains and/or URLs that are considered to be known and reliable (white list). At step 835, the outcome of the verification 830 is checked; if all hyperlinks are reliable, then they will be added to the sender's white list (step 845); otherwise, it will be concluded (step 840) that the message is not reliable and that fraudulent use of the sender's account (email or Skype account) is possibly being made.

In both cases, the result of the verification 830 will be communicated to the waiting client at step 765, who at this point will check if the suspicious URLs have all been considered to be reliable (step 770), after which the process will end. If so, the message will be considered to be trustworthy and the user will be allowed access to it (step 750). Otherwise, access to the suspicious hyperlinks or to the whole message will be denied, depending on the defined security policies (step 760), after which the process will end.

The embodiment of the invention that uses the client-server approach should not be considered in a limiting sense. It is just one way, not the only one, of implementing the invention. As an alternative, the functions performed by the client and by the server may be carried out by a single host process residing in the same machine; in such a case, for example, the blocks 805-820 of FIG. 7a will be sequentially executed between the blocks 720 and 730; also, the data exchanges between client and server will be reduced to a sequence of data storage and reading operations within the same process.

In one embodiment of the invention, the client may reside in a user's client machine 1, and the server may reside in a verification server 6. The man skilled in the art will comprehend, however, that the client and the server must not necessarily reside in two different machines; they may be two processes executed on the same machine and exchanging data locally, e.g., through a TCP/IP Internet port. The man skilled in the art may therefore have the verification server 6 coincide with the user's client machine 1, without however departing from the teachings of the present invention.

The client machine is meant to be a data processing device equipped with a processor capable of processing digital data with the aid of a memory for storing such data, of receiving messages through a physical communication interface (e.g., an Ethernet network card, a Wi-Fi module belonging to the IEEE 802.11 standard family, etc.), as well as of accepting message access requests via input units (keyboard, touchscreen, mouse, etc.) and reproducing contents of hyperlinks contained in messages sent to a user via output units (e.g., screen, loudspeakers, etc.). In addition, the client machine contains software modules allowing the device to use the various units and allowing said modules to operate as described in the present invention. In general, it may therefore be, for example, a desktop or portable PC, a smartphone, a tablet or the like.

The server machine is meant to be a data processing device (computer) equipped with at least one processor capable of processing digital data with the aid of a memory for storing such data into a database, as well as of exchanging data with said client machine through any communication channel. The server machine may either coincide or not with the client machine, in that it comprises a subset of the components of the latter. In general, it should have adequate computation power and storage capacity to be able to carry out the tasks of the server process. The man skilled in the art can decide the best way of implementing the invention as a single host or as a client-server model with distinct machines or with unified machines, depending on the characteristics, in terms of computational power and storage capacity, of the devices to be protected, and also on the security management model (centralized or distributed) to be used.

The present invention may also be combined with other procedures for checking the reliability of message contents. For example, the entire check procedure according to the present invention may be bypassed for a certain category of messages which are considered to be safe, e.g., certified mail. In this case, upstream of the verification 705 of FIG. 7 it will be verified if the message belongs to said category, and the sequence of steps from 710 onwards will only be carried out in the event of a negative outcome.

Figures 4, 5:
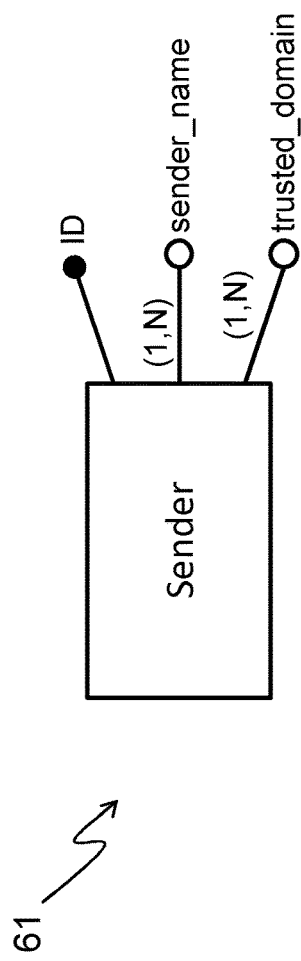
FIG. 4 shows an entity-relation diagram concerning the structure of a database comprised in the server according to the invention.
FIG. 5 shows a database representation in accordance with the entity-relation diagram of FIG. 4.

Also with reference to FIG. 4, the verification server 6 may comprise the database DB, which is preferably a relational database, an object-oriented database or a database of another kind.

The database is preferably created by starting from a scheme 61 designed for application of the invention to a phishing prevention context; such scheme 61 comprises a relation which in turn comprises two attributes: 'sender_name' and 'trusted_domain'. Both of these attributes have one-to-many cardinality, so that more than one 'sender_name' and more than one 'trusted_domain' can be associated with each sender.

Also with reference to FIG. 5, one can see that the scheme 61 can be implemented in a relational database by using two distinct tables: the first one is called senders and the second one is called trusted_domains. The senders table comprises the ID and name columns, which together constitute a key of the table, while the trusted_domains table comprises the ID and URL columns, which together also constitute a key of said table.

Furthermore, aiming at ensuring database integrity, in the ID column of the trusted_domains table there is a referential integrity constraint towards the ID column of the senders table.

The database thus created can be updated by an administrator or directly by senders wanting to benefit from the system 5 through the Internet or another means of communication.

For the purpose of satisfying at best the requirements of a specific application, the man skilled in the art may use a database of a different type and/or with a different scheme, compared with the one described above, without however departing from the teachings of the present invention.

More in general, when this server 6 is contacted by the security module for the execution of the above-described step c., the server 5 will carry out at least the following steps:
e. receiving the address and/or name of the sender of the message from the security module;
f. selecting the validation information specified by the sender.

Step e. can preferably be carried out through the use of the HTTP protocol or another protocol well known to those skilled in the art, whereas step f. can be carried out, for example, by making the following SQL interrogation:
SELECT da.URL
FROM senders AS m, trusted_domains AS da
WHERE m.ID=da.ID AND m.name=?
where the character '?' identifies the sender's address and/or name received during step e. Additionally, step f. may include a broader search for the sender, e.g., aiming at finding those strings of characters that do not differ much from the sender being searched for, i.e., having at most a predefined number of different characters compared to a sender's name stored in said database (DB), so as to reduce the number of false negatives due to intentional or unintentional variations of the sender indicated in the received message. By way of example, let us consider the fake sender "Posta Italiana", which may induce the user to think that it is the real sender called "Poste Italiane". In this case, the search carried out by the server 6 may produce the same results as expected from the search for "Poste Italiane". It is therefore conceivable that the list sent to the client at step 820 contains, in addition to the trusted domains, also the corresponding data of the selected sender that might be slightly different from the one initially searched for.

Figure 6:
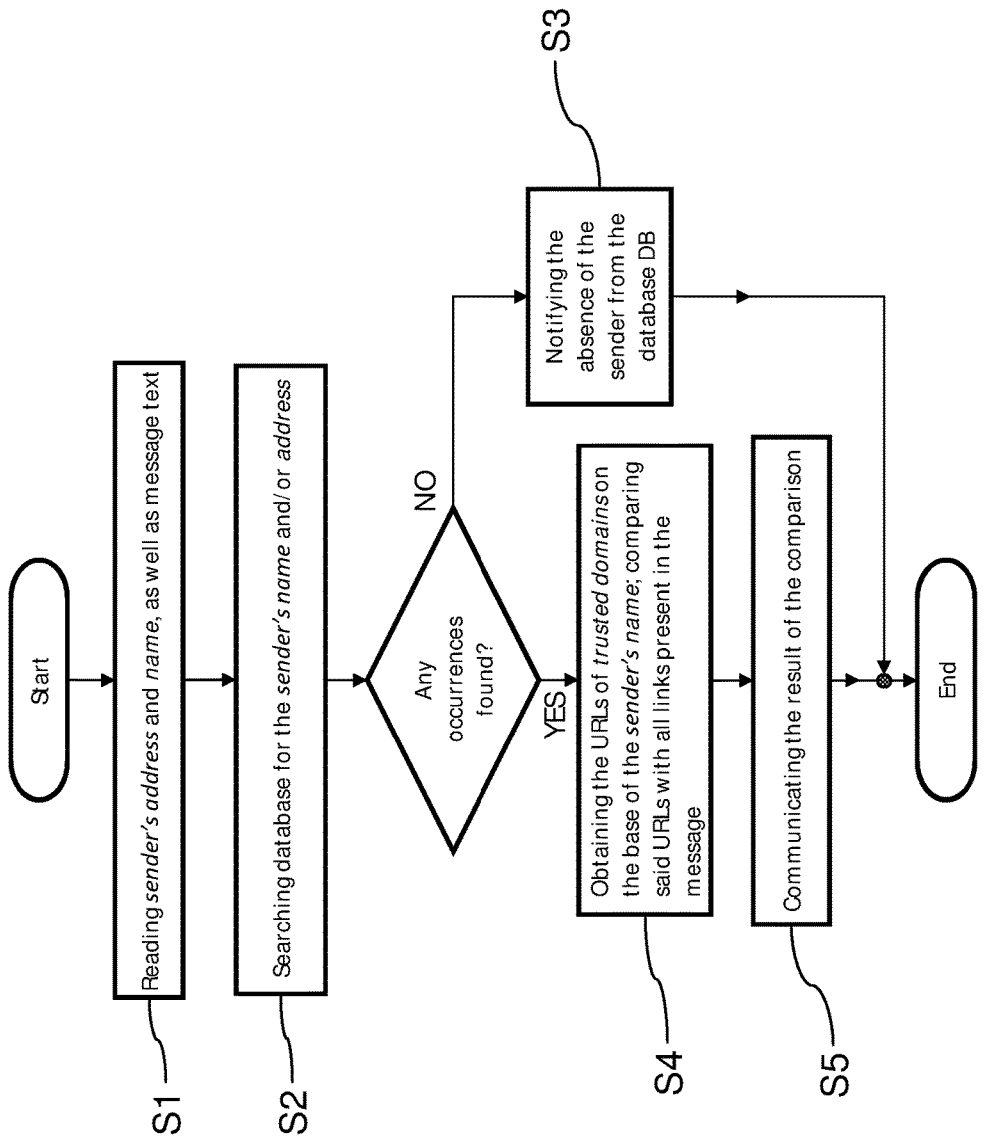
FIG. 6 shows a flow chart representing a mode of operation of the system according to the present invention.

Also with reference to FIG. 6, one possible mode of operation, which is more general than those described above, of the system for filtering electronic messages 5 is represented through a finite-state machine; said finite-state machine may be implemented by the security module comprised in the user's client machine 1, and possibly also partially by the verification server 6, and comprises the following states:
a reading state S1, in which the security module reads the sender's address and/or name and selects one or more sensible parts of a received message by executing the above-described steps a. and b.;
a request state S2, in which the security module interrogates the database by using at least the sender's address and/or name and by executing or having the verification server 6 executes the steps e. and f.;
a verification bypass state S3, in which the security module carries out no verification of the sensible parts of the received message because the sender's address and/or name cannot be associated with any data in the database DB;

a result reading state S4, in which the security module and/or the verification server 6 reads the results of the database interrogation, wherein said results constitute the validation information necessary for verifying the sensible parts of the received message, and compares each sensible part of the message with all validation information by executing step c.;

a result notification state S5, in which the security module communicates the outcome of the comparison made at step 4 by executing step d.

It must be pointed out that the states S2 and S4 are comprised in the execution of step c. by the security module.

When a message 4 is received by the client machine 1, the system 5 enters the reading state S1, after which it will interrogate the appropriate database DB while entering the request state S2. If the interrogation produces no results (occurrences), then the system 5 will notify the user that the sender's address and/or name is not present in the database DB (step S3) and will end the process; otherwise, if there are some results, the system 5 will enter the result reading state S4 and will communicate the verification results to the user of the client machine 1 while entering the result notification state S5, after which its execution will end.

The verification results comprise, in addition to the sender's data (name and/or address) or to a sender's identifier known to the client terminal, the set of trusted Internet domains and/or URLs that the message received from the sender identified by said data may contain because they are considered to be safe. Optionally, for some or all domains or URLs belonging to a domain, admissible access protocols may also be specified: for example, for the URL "www.poste.it/bancoposta.login.asp", it may be specified by whatever means that it can only be included in the message from that sender via the HTTPS protocol, so that the URL will have to begin with the string "https://". Otherwise, the hyperlink will be considered to be dangerous, and hence it will be blocked.

In a first variant of the preferred embodiment of the system 5 just described, a security module (similar to the above-described one) sends the sensible parts of the received message to a verification server (similar to the verification server 6 just described) during the execution of step c. In this manner, the verification server comes to know not only the sender's address and/or name, but also the sensible parts, preferably hyperlinks, of the message received from that sender, so that it is advantageously able to understand if any fraudulent attacks (phishing) are being made against the user of the client machine 1 and the person or institution to which the sender's address corresponds. By concentrating this information within the verification server, it is advantageously possible to configure said server for warning the person or institution to which the sender's address corresponds and/or public security authorities, such as, for example, the national center against computer crime for the protection of critical infrastructures (CNAIPIC, Centro nazionale anticrimine informatico per la protezione delle infrastrutture critiche) or another relevant body, about the fact that at least one fraud attempt is being made.

The concentration of information of this kind advantageously ensures a higher level of supervision, in that a greater number of messages can be analyzed than just those received by a single user.

In a second variant, multiple databases and/or multiple verification servers 6 may be present, and the security module, while executing step c., may select the database to be interrogated on the basis of the information contained therein and/or by choosing the most updated one. This selection may preferably be made according to at least a part of the sender's address, e.g., the container thereof ("@yahoo.it", "gmail.com", etc.), or the like.

In a third variant, the validation information specified by the sender may include only a part of a hyperlink (e.g., a prefix such as "http://poste.it/user="), since parameters are now commonly used. This advantageously prevents the sender (who wants to benefit from the system of the invention) from having to provide a long list of hyperlinks containing repeated elements.

In a fourth variant of the present invention, at step 720 images contained in the message as an embedded graphic file (as opposed to an URL directing to an image residing on a remote site) can be analyzed in order to extract identification information, i.e., digital signatures such as, for example, signatures, features or key points, to be sent to the server for analysis as a replacement for or in addition to the sender's address and/or name. The database DB may comprise, in addition to or instead of the 'sender_name' attribute, a 'key_points' attribute comprising digital signatures such as features or key points of logos, trademarks and other known images of trusted domains. This attribute has one-to-many cardinality, so that more than one 'sender_name' and more than one 'trusted_domain' can be associated with each 'key_points' attribute. After having received the information from the client, the server will search its own database DB for the list of allowable URLs (the so-called white list) for the key_point identified in the communication received from the client. It will then be verified if there are any occurrences for the key points extracted from the message; if there are, the list of allowable Internet domains will be extracted from the database DB and communicated to the client, which will then block the URLs as described at step 760; otherwise, it will be communicated that no occurrences have been found. In such a way, if for example the image identifying the Italian post website 'www.poste.it' is comprised in a message body in combination of or vicinity with URLs pertaining to the domain 'poste.it' or truly associated therewith, then such URLs or the entire message will not be blocked. The same applies to the case that the image is comprised in a message coming from a sender pertaining to such domain and to the others similar or truly connected thereto specified in the relevant white list.

As is known to the man skilled in the art, features or key points can be extracted by using image processing algorithms, while features or key points can be compared in the server by using known image recognition techniques. This further variant offers the advantage of finding messages that fraudulently contain images, logos and trademarks of trusted sites for the purpose of deceiving the potential victim.

In a further variant, the sender may also specify the period of validity of the validation information, thus advantageously increasing the degree of security of the system according to the invention.

In a further variant, the database DB may also comprise a list of domains and/or hyperlinks which are considered to be safe and reliable regardless of the sender, i.e., which are valid for all senders, for the purpose of saving memory. If a given message only contains contents which are included in this universal list, then its contents will be trusted regardless of the sender.

The invention may therefore be subject to many variations, without however departing from the novelty spirit of the inventive idea. It will be apparent to those skilled in the art that in the practical implementation of the invention the illustrated details may have different shapes or be replaced with other technically equivalent elements. It can therefore be easily understood that the present invention is not limited to the explanatory examples described herein, but may be subject to many modifications, improvements or replacements of equivalent parts and elements without departing from the basic inventive idea, as set out in the following claims.

The invention claimed is:

1. A method for validating an electronic message received by a client machine, wherein the electronic message includes a header comprising identification data which identify a sender of the message, and a body suitable for containing digital images and one or more hyperlinks, the client machine comprising a processor, a first memory configured to store the electronic messages, a communication interface configured to receive the electronic message and a user input unit configured to receive requests for accessing the one or more hyperlinks comprised in the body from a user, wherein the processor is configured to implement the method by:

processing at least one digital image found in the body for obtaining digital signatures which identify the at least one digital image, finding and storing the one or more hyperlinks present in the body of the message in the first memory, retrieving a set of trusted Internet domains by interrogating a database stored in a second memory using said digital signatures, wherein said database contains relations between groups of digital signatures and groups of Internet domains considered to be trusted when associated to images identified by said digital signatures, verifying that the one or more hyperlinks present in the body of the message belong to said set of trusted Internet domains found in the database, and allowing or denying, to the user input unit, access to at least part of the body of the message in which the one or more hyperlinks are present, based on whether said one or more hyperlinks pertain or not to said set of trusted Internet domains.

2. The method according to claim 1, wherein, if a hyperlink is not comprised in said set of trusted Internet domains for a given digital image signature, a trustworthiness verification of said hyperlink is carried out and out and, if the trustworthiness verification is successful, said hyperlink is added in said database to the group of Internet domains considered trusted for the given digital image signatures, whereas if the trustworthiness verification is unsuccessful, access to said hyperlink in the electronic message will be denied.

3. A system for validating an electronic message, the electronic message including a header comprising identification data which identify a sender of the message, and a body suitable for containing digital images and one or more hyperlinks, the system comprising:

a client machine including a processor, a first memory configured to store the electronic message, a communication interface configured to receive the electronic message and a user input unit configured to receive requests for accessing the one or more hyperlinks comprised in the body from a user, the processor being configured for executing a security module, wherein the security module has access to at least one message sent by a sender and received by the client machine, wherein the security module comprises a set of instructions executed by the processor for performing the steps of:

processing at least one of the digital images found in the body for obtaining digital signatures which identify the at least one digital image, finding and storing the one or more hyperlinks present in the body of the message in the first memory, retrieving a set of trusted Internet domains by interrogating a database stored in a second memory using said digital signatures, wherein said database contains relations between groups of digital signatures and groups of Internet domains considered to be trusted when associated to images identified by said digital signatures, verifying that said one or more hyperlinks present in the body of the electronic message belong to said set of trusted Internet domains found in the database, and allowing or denying, to the user input unit, access to at least part of the body of the electronic message in which the one or more hyperlinks are present, based on whether said one or more hyperlinks pertain or not to said set of trusted Internet domains.

4. The system according to claim 3, wherein the verification carried out during the verification of the one or more hyperlinks is successful if each one of the hyperlinks or parts thereof included in the message refers to a content present in at least one of the trusted Internet domains, otherwise the verification is unsuccessful.

5. The system according to claim 3, wherein, if the verification of the one or more hyperlinks is unsuccessful, then access to the one or more hyperlinks of the message will be denied, and if the verification of the one or more hyperlinks is successful, then the user of the client machine will be allowed to access the one or more hyperlinks.

6. The system according to claim 3, wherein, if a hyperlink is not comprised in said group of trusted Internet domains for a given digital image signature, a trustworthiness verification of the said hyperlink is carried out and, if the trustworthiness verification is successful, said hyperlink is added in said database to the group of Internet domains considered trusted for the given digital image signatures, whereas if the trustworthiness verification is unsuccessful, access to said hyperlink in the electronic message will be denied.

7. A method for validating an electronic message received by a client machine, in a system that includes the client machine and a server machine, wherein the electronic message includes a header comprising identification data which identify a sender of the electronic message, and a body suitable for containing digital images and one or more hyperlinks, the server machine and the client machine each including a processor, a memory and a communication interface configured to receive data from the other machine, wherein the client and the server processors are configured to carry out the method having the following steps:

the client processor receiving requests from a user to access one or more hyperlinks comprised in the body, processing at least one digital image found in the body for obtaining digital signatures which identify the at least one digital image, finding and storing the one or more hyperlinks present in the body of the message in the client memory;

the server processor receiving, from the client machine, by means of the communication interface, said digital signatures obtained by the client machine from the electronic message, retrieving a set of trusted Internet domains by interrogating a database stored in the server memory using said digital signatures, wherein said database contains relations between groups of digital signatures and groups of Internet domains considered to be trusted when associated to images identified by said digital signatures, verifying that said one or more hyperlinks present in the body of the message belong to said groups of trusted Internet domains found in the database, and sending said set of trusted Internet domains found in the database to the client machine; and the client processor receiving said set of trusted Internet domains by means of said communication interface, allowing or denying, to the user input unit, access to at least part of the body of the electronic message in which the one or more hyperlinks are present, based on the fact that said one or more hyperlinks pertain or not to said set of trusted Internet domains.

8. A system for validating an electronic message received by a client machine in a system that includes the client machine and a server machine, wherein the electronic message includes a header comprising identification data which identify a sender of the electronic message, and a body suitable for containing digital images and one or more hyperlinks, the server machine and the client machine each including a processor, a memory and a communication interface configured to receive data from the other machine, wherein the client and the server processors are configured to carry out the following steps:

the client processor receiving requests from a user to access one or more hyperlinks comprised in the body, processing at least one digital image found in the body for obtaining digital signatures which identify the at least one digital image, finding and storing the one or more hyperlinks present in the body of the message in the client memory;

the server processor receiving, from the client machine, by means of the communication interface, said digital signatures obtained by the client machine from the electronic message, retrieving a set of trusted Internet domains by interrogating a database stored in the server memory using said digital signatures, wherein said database contains relations between groups of digital signatures and groups of Internet domains considered to be trusted when associated to images identified by said digital signatures, verifying that said one or more hyperlinks present in the body of the message belong to said group of trusted Internet domains found in the database, sending said set of trusted Internet domains found in the database to the client machine; and the client processor receiving said set of trusted Internet domains by means of said communication interface, allowing or denying, to the user input unit, access to at least part of the body of the electronic message in which the one or more hyperlinks are present, based on the fact that said one or more hyperlinks pertain or not to said set of trusted Internet domains.

9. A host machine for validating an electronic message received by the host machine, wherein the electronic message includes a header and a body suitable to contain digital images and one or more hyperlinks, the host machine comprising:
 a processor,
 a memory,
 a user input unit configured to receive requests for accessing the one or more hyperlinks comprised in the body from a user, and
 a communication interface configured to receive the at least one electronic message,
 wherein the processor is configured to:
  receive by means of the communication interface, the electronic message,
  process at least one digital image found in the body for obtaining digital signatures which identify the at least one digital image,
  find and store the one or more hyperlinks present in the body of the message in the memory,
  retrieve a set of trusted Internet domains by interrogating a database stored in the memory using said digital signatures, wherein said database contains relations between groups of digital signatures and groups of Internet domains considered to be trusted when associated to images identified by said digital signatures,
  verify that said one or more hyperlinks present in the body of the message belong to said set of trusted Internet domains found in the database, and
  allow or deny, to the user input unit, access to at least part of the body of the electronic message in which the one or more hyperlinks are present, based on the fact that said one or more hyperlinks pertain or not to said set of trusted Internet domains.

10. The method according to claim 7, wherein the server processor further notifies the client machine of an absence of trusted Internet domains associated to elements of the electronic message.

11. The method according to claim 7, wherein the data received from the client processor comprise at least one of the one or more hyperlinks contained in the electronic message, along with elements of the electronic message.

12. The system according to claim 8, wherein the server processor further notifies the client machine of an absence of trusted Internet domains associated to elements of the electronic message.

13. The system according to claim 8, wherein the data received from the client processor comprise at least one of the one or more hyperlinks contained in the electronic message, along with elements of the electronic message.

14. A method for validating an electronic message received by a client machine, wherein the electronic message includes a header comprising identification data which identify a sender of the electronic message, and a body suitable for containing digital images and one or more hyperlinks, the client machine comprising a processor, a first memory configured to store the electronic messages, a communication interface configured to receive the electronic message and a user input unit configured to receive requests for accessing the one or more hyperlinks comprised in the body from a user, wherein the processor is configured to implement the method by:
 processing at least one digital image found in the body for obtaining digital signatures which identify the at least one digital image,
 reading the sender's identification data from the header of the electronic message,
 finding and storing the one or more hyperlinks present in the body of the message in the first memory,
 retrieving a first set of trusted Internet domains by interrogating a database stored in a second memory using said digital signatures, wherein said database contains relations between groups of digital signatures and groups of Internet domains considered to be trusted when associated to images identified by said digital signatures, retrieving a second set of trusted Internet domains by interrogating the database stored in the second memory using said sender's identification data, wherein said database contains relations between groups of sender's identification data and groups of Internet domains considered to be trusted when referred by the sender of the message identified by one of said groups of sender's identification data, verifying that the one or more hyperlinks present in the body of the message belong to said first and second set of trusted Internet domains found in the database, and allowing or denying, to the user input unit, access to at least part of the body of the message in which the one or more hyperlinks are present, based on whether said one or more hyperlinks pertain or not to said first and second set of trusted Internet domains.

15. The method according to claim 14, wherein, if a hyperlink is not comprised in said first or second set of trusted Internet domains for a given sender or a given digital image signature, a trustworthiness verification of said hyperlink is carried out and out and, if the trustworthiness verification is successful, said hyperlink is added in said database to the group of Internet domains considered trusted for the given sender or for the given digital image signatures, whereas if the trustworthiness verification is unsuccessful, access to said hyperlink in the electronic message will be denied.

16. A system for validating an electronic message, the electronic message including a header comprising identification data which identify a sender of the message, and a body suitable for containing digital images and one or more hyperlinks, the system comprising:

a client machine including a processor, a first memory configured to store the electronic message, a communication interface configured to receive the electronic message and a user input unit configured to receive requests for accessing the one or more hyperlinks comprised in the body from a user, the processor being configured for executing a security module, wherein the security module has access to at least one message sent by a sender and received by the client machine, wherein the security module comprises a set of instructions executed by the processor for performing the steps of:

processing at least one of the digital images found in the body for obtaining digital signatures which identify the at least one digital image, reading the sender's identification data from the header, finding and storing the one or more hyperlinks present in the body of the message in the first memory, retrieving a first set of trusted Internet domains by interrogating a database stored in a second memory using said digital signatures, wherein said database contains relations between groups of digital signatures and groups of Internet domains considered to be trusted when associated to images identified by said digital signatures, retrieving a second set of trusted Internet domains by interrogating the database stored in the second memory using said sender's identification data, wherein said database contains relations between groups of sender's identification data and groups of Internet domains considered to be trusted when referred by the sender of the message identified by one of said groups of sender's identification data, verifying that said one or more hyperlinks present in the body of the electronic message belong to said first and second set of trusted Internet domains found in the database, allowing or denying, to the user input unit, access to at least part of the body of the electronic message in which the one or more hyperlinks are present, based on whether said one or more hyperlinks pertain or not to said first and second set of trusted Internet domains.

17. The system according to claim 16, wherein the verification carried out during the verification of the one or more hyperlinks is successful if each one of the hyperlinks or parts thereof included in the message refers to a content present in at least one of the trusted Internet domains, otherwise the verification is unsuccessful.

18. The system according to claim 16, wherein, if the verification of the one or more hyperlinks is unsuccessful, then access to the one or more hyperlinks of the message will be denied, and if the verification of the one or more hyperlinks is successful, then the user of the client machine will be allowed to access the one or more hyperlinks.

19. The system according to claim 16, wherein the sender's identification data comprise a name and/or an address, and wherein the retrieved trusted Internet domains for a given sender are considered trusted if contained in electronic messages coming from senders identified through a name and/or an address having at most a predefined number of different characters compared to a sender's name or address stored in the database.

* * * * *